March 4, 1941.  H. C. DICKINSON ET AL  2,233,403
METHOD FOR INDICATING THE WEAR ON BEARINGS AND OTHER SURFACES
Filed Dec. 1, 1938  4 Sheets-Sheet 1

Inventors:
Hobart C. Dickinson
Samuel A. McKee
By J. S. Mothershead
attorney.

March 4, 1941. H. C. DICKINSON ET AL 2,233,403
METHOD FOR INDICATING THE WEAR ON BEARINGS AND OTHER SURFACES
Filed Dec. 1, 1938 4 Sheets-Sheet 2

Inventors
Hobart C. Dickinson and
Samuel A. McKee
By J. Mortinshead
Attorney

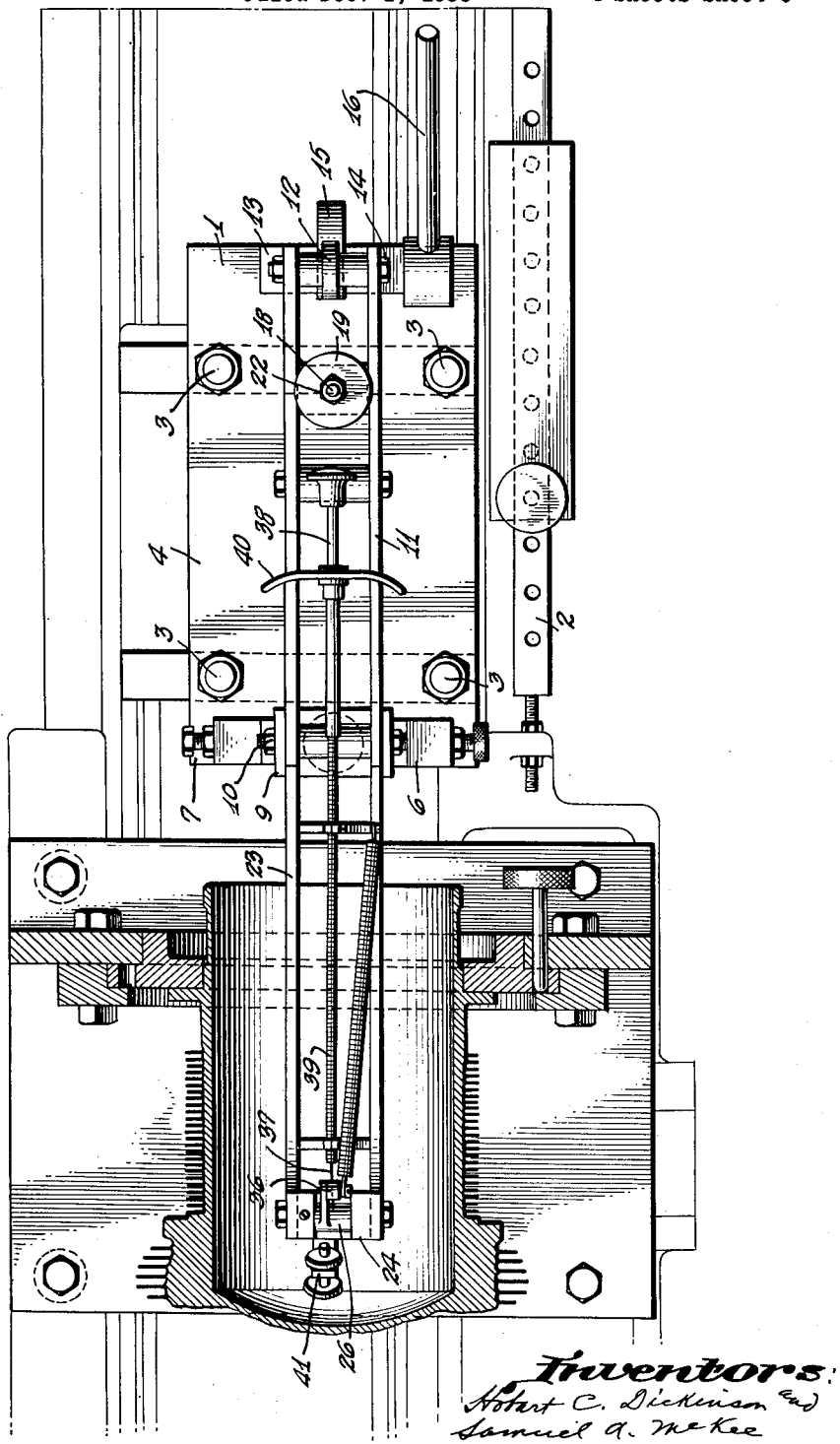

March 4, 1941.  H. C. DICKINSON ET AL  2,233,403
METHOD FOR INDICATING THE WEAR ON BEARINGS AND OTHER SURFACES
Filed Dec. 1, 1938  4 Sheets-Sheet 4

Inventors:
Hobart C. Dickinson
Samuel A. McKee
By J. B. Mothershead
attorney.

Patented Mar. 4, 1941

2,233,403

UNITED STATES PATENT OFFICE 2,233,403

METHOD FOR INDICATING THE WEAR ON BEARINGS AND OTHER SURFACES

Hobart C. Dickinson, Washington, D. C., and Samuel A. McKee, Bethesda, Md., assignors to the Government of the United States, as represented by the Secretary of Commerce Application December 1, 1938, Serial No. 243,392

1 Claim. (Cl. 73—51)

(Granted under the act of March 3, 1883, as amended April 30, 1928; 370 O. G. 757)

The invention described herein may be manufactured and used by or for the Government of the United State for governmental purposes without the payment to us of any royalty thereon in accordance with the provisions of the act of April 30, 1928 (ch. 460, 45 Stat. L. 467).

This invention relates to a method for use in determining accurately and conveniently the amount of material which has been removed from surfaces, such as those of metal and other hard materials, after such surfaces have been subjected to wear, abrasion, grinding, lapping, honing or to any other action, process or conditions which removes surface material from the surface involved.

The apparatus which may be conveniently employed in carrying out this invention is designed, constructed and arranged to produce in the surface of the material before it has been subjected to wear or other action which removes surface material therefrom, one or more elongated marks, indentations or depressions of definite form and dimensions so that the removal of the surface material so marked, indented or impressed, by subsequent wear or other surface-removing action will reduce the dimensions of the mark, indentation or depression and thus furnish an accurate indication of the amount of surface material which has been removed when the reduced dimensions of the mark, indentation or depression has been measured.

Apparatus for determining the hardness of material by marks, indentations or impressions applied to the material are in common use. In such devices the hardness of the material is indicated by its ability to resist the entrance of the marking, indenting or impressing tool or element. As distinguished from such devices, the present apparatus provides for marking, indenting or impressing the material to a definite and predetermined depth and dimensions regardless of the hardness of the material or the amount of pressure required to so mark, indent or impress the material. The two methods and apparatus required are therefore essentially different; are used for different purposes and for different results and should not be confounded one with the other, the only element of similarity being that the surface of the material involved is subjected to a mark, indention or depression in both cases.

In carrying out the present invention, the indentations may be made in the surface of the material involved by any suitable method such as by the impression of a hard object of the required dimensions or by a cutting process which will yield an indentation, impression or incision of known dimensions, and in the practice of this invention, we have found that an indentation such as is yielded by an indentor of the form as disclosed in the United States patent to Frederick Knoop, No. 2,091,995, September 27, 1937, is satisfactory.

The invention is particularly useful for measuring the wear on the bearing surfaces of shafts, machines and mechanisms, such as the cylinders, pistons and other wearing surfaces of aircraft engines and the like, and the example of apparatus shown in the accompanying drawings has been built to produce the desired marks, indentations or depressions in such devices which are to be subsequently observed and their dimensions measured by any suitable apparatus.

The accompanying drawings will illustrate one embodiment of the apparatus.

Fig. 7 is a side elevation, partly in section of one embodiment of the apparatus for applying the desired indentations to a wearing surface such as the cylinder of an airplane engine.

Fig. 8 is a top plan view of the same.

Figure 1:
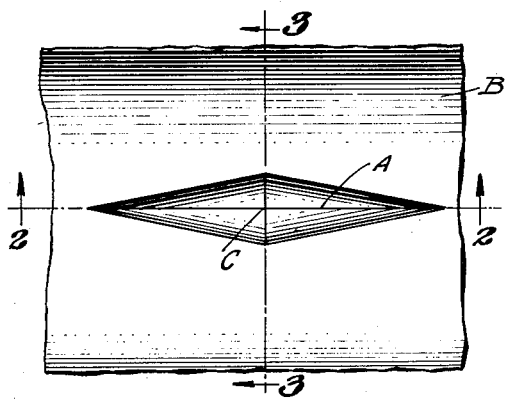
Fig. 1 is a greatly enlarged plan view showing the form and dimensions of an indentation impressed in a wearing surface which we have found to be satisfactory and practical in use.
Figure 4:
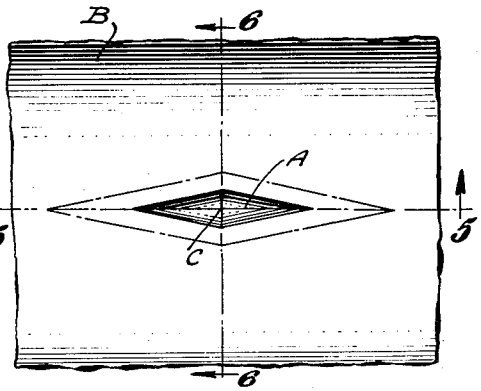
Figs. 4, 5 and 6 are views similar to Figs. 1, 2 and 3 showing the reduction of the dimensions of the indentation in full lines after some wear has occurred, and showing the original dimensions of the indentations in dotted lines.

In the accompanying drawings in which like numerals of reference indicate the same parts throughout, 1 indicates the apparatus or indentation applicator which includes a base 2 having four upstanding studs 3 (only 2 of which are shown in Fig. 7). These studs 3 support the horizontal table 4 upon which the indentation applicator is mounted.

Pivoted at 5 in an upstanding yoke 6 mounted at one end 7 of the table 4, is the indentation arm or lever 8. This arm or lever 8 is provided at its pivotal point 5 with 2 upstanding plates 9 (one only of which is shown in Fig. 7) which two plates form a yoke within which is pivoted at 10 the cam actuated lever 11. This cam actuated lever 11 is longer than the complementary arm of the indentation lever 8 and extends beyond the same a distance sufficient to accommodate a roller 12 in the extending end thereof.

Mounted on the table 4 at a point beneath the roller 12 is a bearing-block 13 in which is horizontally mounted a shaft 14 carrying fixed thereto a cam 15 and an actuating lever 16, the parts being so positioned, as shown in Fig. 7, that the cam 15 lies in operative engagement with the roller 12 in the end of the pivoted lever 11.

Pivotally mounted in the end of the arm of the lever 8 at 17 adjacent the cam 15 is an upstanding threaded bolt or pin 18 which passes through a block pivoted in the lever 11 and carries a spring retaining cup 19 at its upper end and also a similar spring retaining cup 20 on the upper face of the said block. A coil extension spring 21 is mounted on said bolt or pin 18 between the upper and lower retaining cups 19 and 20 so that the spring tends to depress the free end of the lever 11 and to raise the adjacent end of the indentation lever 8. Nuts 22 on the threaded end of the bolt or pin 18 provide for adjusting the tension of the spring 21. From this arrangement of the parts, it will be seen that the lifting movement of the lever 11 under the influence of the cam 15 acting against the roller 12 is not directly applied to the indentation lever 8 by the cam 15, but that the lifting movement imparted by the cam to the lever 11 is indirectly imparted to the indentation lever 8 through the medium of the coil spring assembly just described.

Mounted in the end of the arm 23 of the indentation lever 8 is the indentation head 24.

Figure 10:
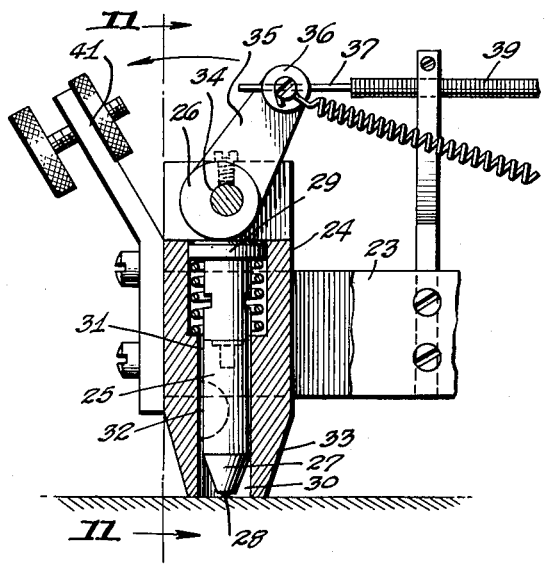
Fig. 10 is an enlarged vertical sectional view through the indentation head.
Figure 11:
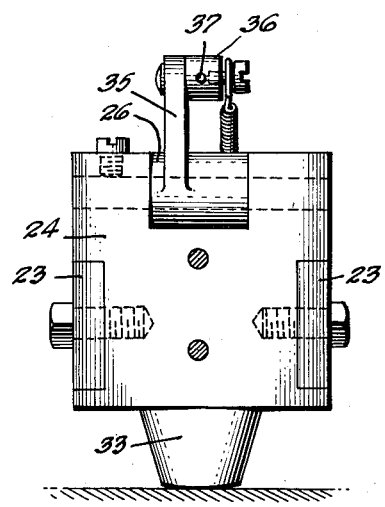
Fig. 11 is a transverse vertical sectional view taken on line 11—11 of Fig. 10.

Referring to Figure 10 it will be seen that this head is bored centrally to mount the indentation pin 25 vertically therein, and is bored to accommodate the indentation cam 26 (Figs. 10 and 11). The indentation pin 25 (Fig. 10) is round in cross-section and tapered at its bottom to form a tip 27 in the end of which the diamond indentor 28 is mounted, while its upper end is enlarged in diameter to provide a head 29 against which the indentation cam 26 operates.

In order to prevent rotation of the indentation pin 25 within the indentation head 24, the bore 30 in the indentation head is key slotted at 31 to receive a Woodruff key 32 fixed in the indentation pin 25. The indentation pin 25 is therefore allowed free movement vertically within the indentation head 24 and its depending conical stop 33 but is held against rotation therein.

Pivotally mounted at 34 in the indentation head 24 is the indentation cam 26. The cam includes an arm 35 and a suitable connection 36 for pivotally connecting thereto a suitable actuating link 37 to which a plunger 38 is connected at its other end (Fig. 7). This link 37 passes through a casing 39 to one end of which is attached a hand grip 40 (Fig. 8) which receives the plunger 38, while a cam stop 41 is provided on the face of the indentation head 24 to control the downward movement of the indentation pin and its diamond indentor. The depth of the indentation may also be controlled by the thickness of the head 29 of the indentation pin 25, as more or less metal can be removed from the top face of the head 29 and thus the effective downward movement of the indentation pin 25 and its diamond indentor 28 by the indentation cam 26 may be controlled.

Figure 2:
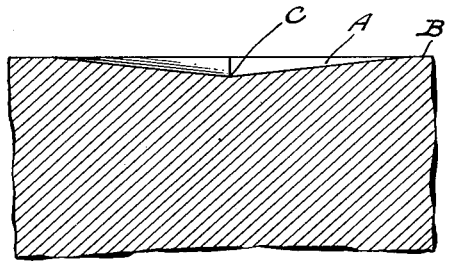
Fig. 2 is a vertical longitudinal sectional view taken through the wearing surface shown in Fig. 1 on the line 2—2 of said figure which passes through the major axis of the indentation.
Figure 5:
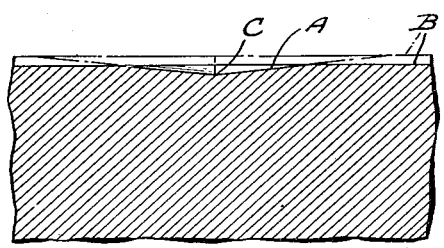
Figure 3:
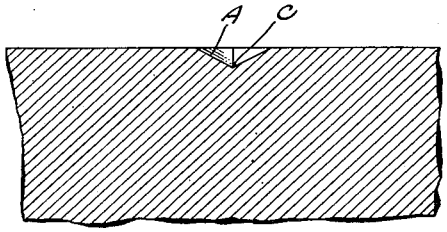
Fig. 3 is a vertical transverse section view through the wearing surface shown in Fig. 1 on the line 3—3 which passes through the minor axis of the indentation.
Figure 6:
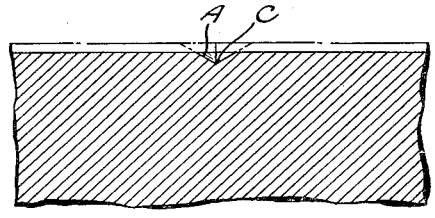
Figure 2:
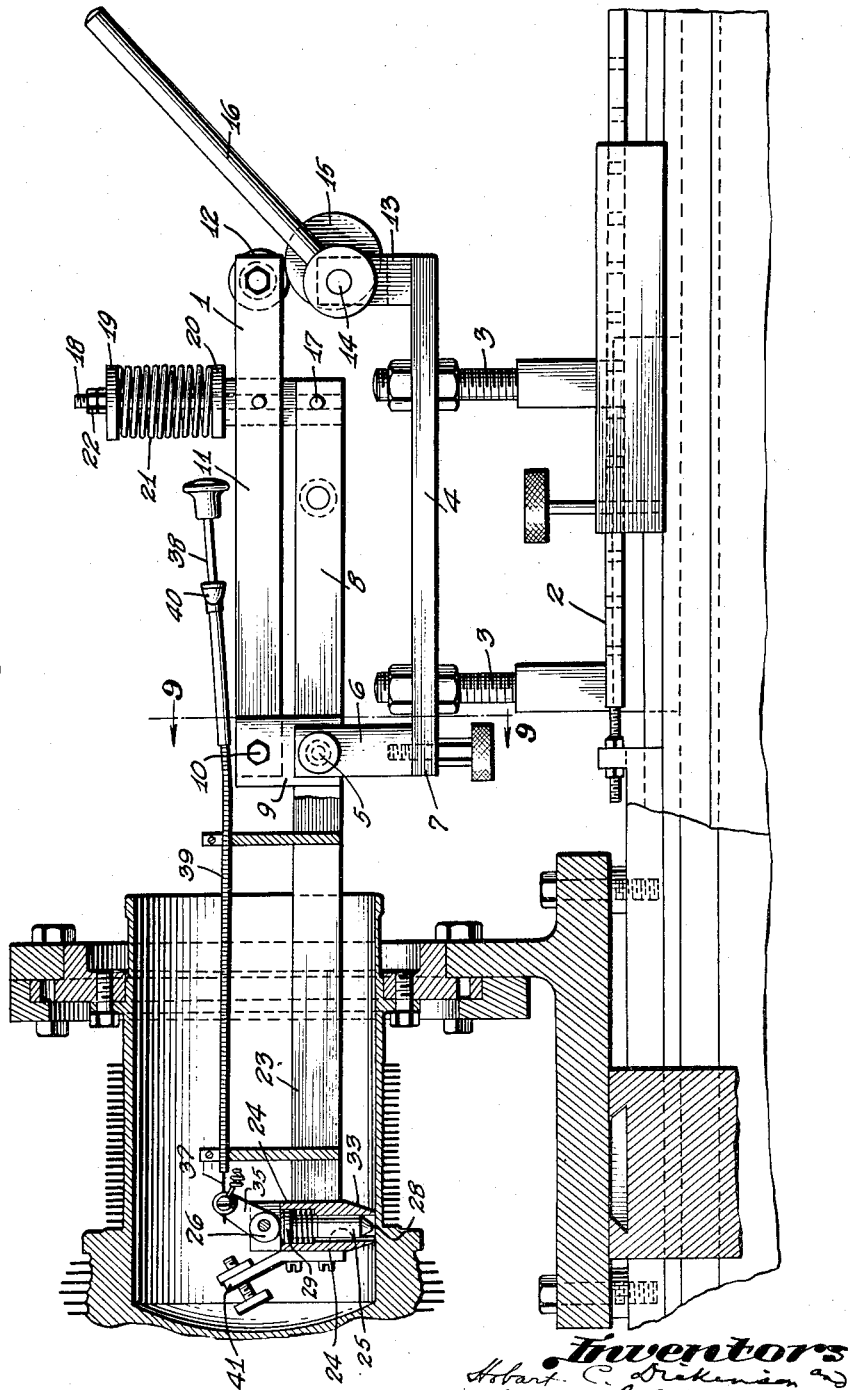
Figure 9:
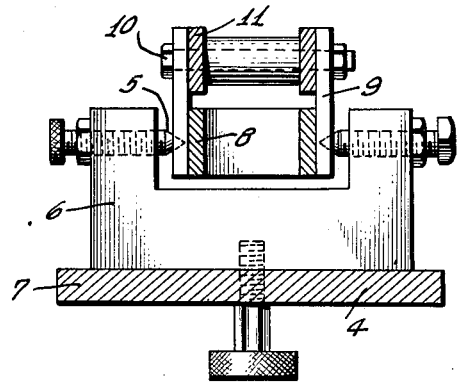
Fig. 9 is a transverse vertical sectional view taken on line 9—9 of Fig. 7.

Having thus described one example of an apparatus for applying indentations to bearing surfaces in accordance with the purposes of this invention, its operation is as follows:

The indentations are applied by means of the specially ground diamond indentor 28 which is forced by pressure into the metal of the surface involved to a predetermined depth as for example, to a depth of about 0.001 inch, and the indentor is shaped to make an indentation in the surface material in the form of an inverted pyramid, the base of which is in the form of a rhombus A (Fig. 1), and lies in the plane of the surface of the material B, while the apex C of the indentation lies below the surface (Figs. 2 and 3). From this it will be seen that there is a definite relation between the lengths of the major and minor axes of the base of the indentation and its depth or altitude. It follows that when surface material is removed by wear or other process the reduction in the dimensions of the base of the indentation is proportional to the reduction in its depth or altitude. Hence in order to determine the amount of reduction in the depth or altitude of the indentation, which reduction represents accurately the amount of surface material which has been removed by wear or other means, it is only necessary to measure the extent of reduction in length of the major axis of the base A of the indentation in order to arrive at an accurate determination of the thickness of the metal which has been removed from the wearing surface.

The dimensions of a satisfactory indentation when made in a new bearing surface are as indicated in Fig. 1, wherein its major axis is 0.0276"; its minor axis 0.0055" and its depth or altitude 0.00102", the length of the major axis being about five times that of the minor axis. For such indentations having a depth of about 0.001", the major axis is about 70 arbitrary scale divisions thus a reduction of the length of the major axis by wear on the surface material from about 70 scale divisions to about 35 scale divisions, or one-half its original length, would accurately indicate a reduction of one half the depth or altitude of the indentation or a wear of 0.0005". The arbitrary scale divisions can be modified at will to match any desired depth scale. Correction naturally has to be made for any curvature of the piece on which the impression is made, though under most conditions met in practice the correction required is negligible.

The element or surface to be indented, such as the cylinder of an airplane engine is suitably mounted and positioned so as to receive the indentation head 24 of the applicator apparatus as shown in Fig. 7. The cam lever 16 is moved by one hand of the operator to rotate the cam 15 in engagement with the roller 12 on the end of the lever 11 to raise said lever. This upward movement of the end of the lever 11 is communicated to the complementary arm of the indentation lever 8 through the medium of the coil spring 21 and its assembly which are mounted on said levers, and depresses the indentation head 24 and brings the conical stop 33 thereof into contact with the surface to be indented and holds the indentation head in its operative position against the surface to be indented by pressure exerted by the coil spring 21 on the indentation lever 8. The indentation pin 25 carrying the diamond indentor 28 is then depressed by the other hand of the operator by pushing the plunger 38 into its hand-grip 40, thus moving the link 37 and actuating the indentation cam 26 on the indentation head 24. The cam 26 contacting with the head of the indentation pin forces said pin downwardly and causes the diamond indentor to impress its indentation into the surface of the material involved, the cam stop 41 on the indentation head limiting the movement of the cam 26 and the downward movement of the indentation pin 25.

On removal of the pressure exerted by both hands of the operator, the indentation pin 25 and the indentation head 24 are returned to their original safe position so that if desired the indented element may be moved to another position to receive another indention. The purpose of arranging the apparatus so that both hands of the operator are required for its operation, is to avoid the possibility of the operator moving the indented element or part until the diamond indentor is in a safe position.

It is apparent that any suitable applicator mechanism may be employed for impressing the required indentation or indentations, and it is to be clearly understood that the description and the accompanying drawings are directed to an example of one suitable apparatus.

Likewise it is apparent that the invention is applicable for use on wearing surfaces other than those of engines and machine elements, such, for instance as on gauges which are subject to wear in use and to surfaces being ground or lapped so that the process of the grinding or lapping process may be observed.

For many purposes, actual measurement of the indentations may not be necessary, simple observations being sufficient. For instance, if a given part is to be discarded when 0.0001" has been worn away, indentations of different depths may be impressed in the part, and when those less than 0.0001" have been worn away, as shown by simple observations, the part may be discarded.

Likewise it is obvious that the invention is applicable in any instance where the formation of suitably shaped indentations of predetermined microscopic length and depth will, by subsequent examination accurately indicate the thickness of surface material which has been removed after the indentations were impressed in the original surface.

While the position of the major axis of the indentation with respect to the direction of movement of the element which causes the wear or removal of material from the indented surface is not critical, we have found that it is desirable to impress the major axis of the mark or indentation at right angles to the direction of motion of elements such as pistons and the like. In such mechanisms, the pistons and rings moving axially of the cylinder tend to deposit any abrasive material which they carry in the ends of the marks or indentations if they have their long axes in line with the direction of movement of the piston or like moving element. The effect of this is to cause the sharp ends of the mark or indentation to become frayed and indistinct when the long axis of the marks lies in the direction of motion of the moving element. If the long axes of the marks lie at right angles to the direction of motion, the sharp ends of the mark remain clearly defined and easily observed.

On the other hand, if the material of an indented surface is removed as by grinding with a grinding wheel, it is preferable to have the major axes of the marks or indentations indented in the material so as to lie parallel to the direction of motion. If they are disposed in the transverse direction, such grinding process causes the surface metal to flow across the sharp ends of the mark or indentation, tending to obscure them and rendering accurate measurement more difficult.

We claim:

The herein described method for determining the amount or thickness of material which has been removed from a surface that has been subjected to wear or other surface removing action which includes forming an elongated tapered depression of predetermined length and depth in the surface of the material before it has been subjected to such surface removing action, the length of the depression bearing a definite relation to its depth, and then measuring the length of the depression after the material has been subjected to wear or other surface removing action.

HOBART C. DICKINSON.
SAMUEL A. McKEE.